(12) United States Patent
Shimazaki

(10) Patent No.: US 8,259,332 B2
(45) Date of Patent: Sep. 4, 2012

(54) PRINTING APPARATUS AND PRINTING SYSTEM

(75) Inventor: Atsushi Shimazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 12/781,237

(22) Filed: May 17, 2010

(65) Prior Publication Data

US 2010/0315671 A1    Dec. 16, 2010

(30) Foreign Application Priority Data

Jun. 16, 2009    (JP) ................................. 2009-143666

(51) Int. Cl.
*G06F 15/00*    (2006.01)
*G06K 1/00*    (2006.01)
(52) U.S. Cl. .................. 358/1.15; 358/1.1; 358/1.13
(58) Field of Classification Search ................. None
See application file for complete search history.

(56) References Cited

U.S. PATENT DOCUMENTS

| 2007/0067413 A1 | 3/2007 | Nishio | 709/217 |
| 2007/0124513 A1 | 5/2007 | Kikuchi | 710/8 |
| 2007/0153323 A1 | 7/2007 | Shimazaki | 358/1.15 |

FOREIGN PATENT DOCUMENTS

| JP | 2006-202210 A | 8/2006 |
| JP | 2007-066092 A | 3/2007 |
| JP | 2007-122376 A | 5/2007 |

*Primary Examiner* — Thierry Pham

(74) *Attorney, Agent, or Firm* — Fitzpatrick, Cella, Harper & Scinto

(57) ABSTRACT

In a conventional system, an eventing method and status inquiry method based on one-to-one communication are not suitable for notifying many unspecified network-connected hosts of the status of an apparatus in accordance with the WSD and UPnP protocols. A multicast packet capable of notifying many unspecified apparatuses of the status using one packet cannot transmit statuses other than connection and disconnection of an apparatus. To solve these problems, when the status of an apparatus changes, an identifier which is contained in a multicast packet and indicates the apparatus itself is sent after being replaced in accordance with the apparatus status without changing a format defined by a standard protocol. Upon receiving the packet, an apparatus determines, from the identifier contained in the multicast packet, whether to acquire information of the apparatus.

10 Claims, 15 Drawing Sheets

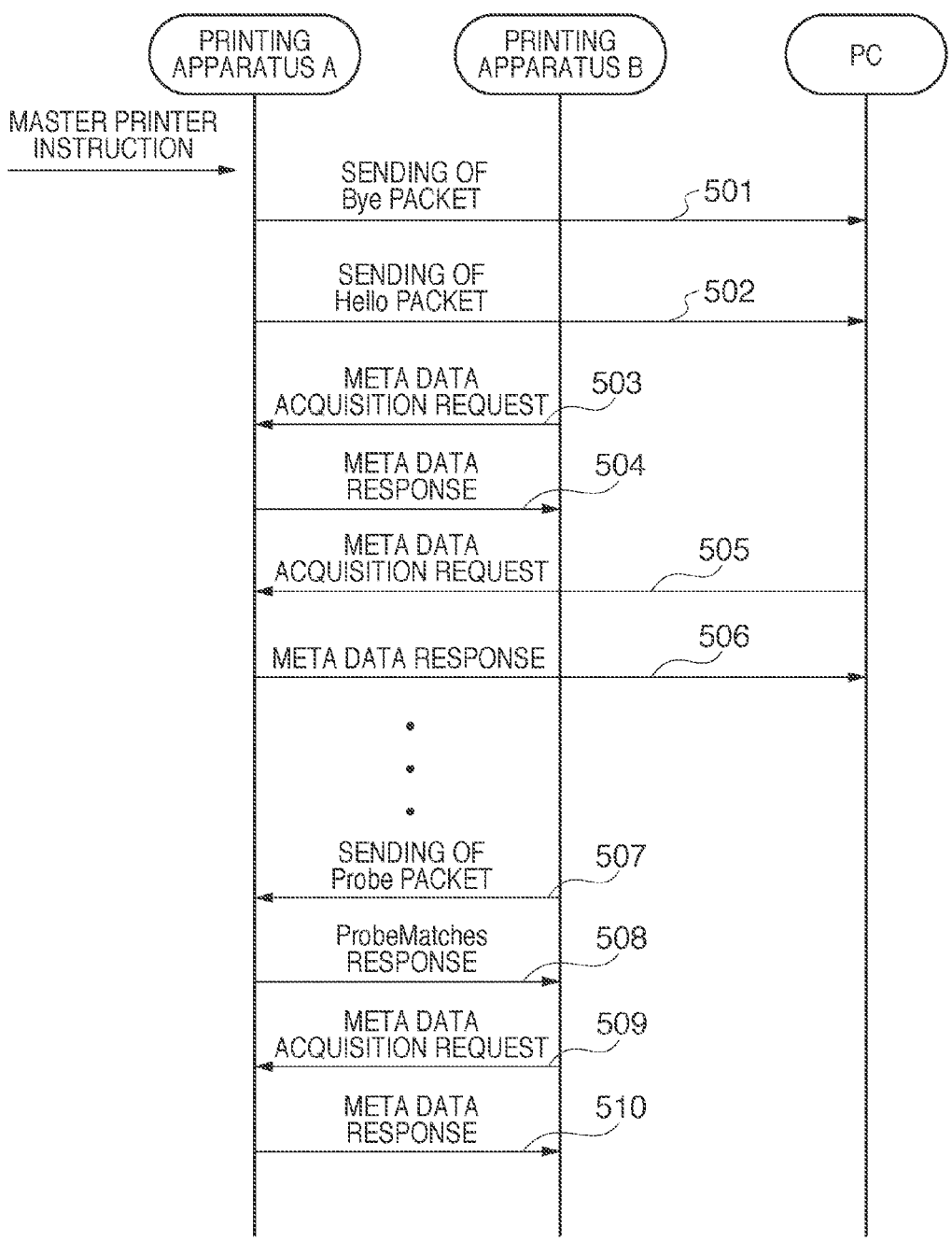

FIG. 6A

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
    <soap:Header>
        <wsa:Action>http://schemas.xmlsoap.org/ws/2005/04/discovery/Hello</wsa:Action>
        <wsa:MessageID>uuid:15aa6190-1dd2-11b2-a2ac-000085123456</wsa:MessageID>
        <wsa:To>urn:schemas-xmlsoap-org:ws:2005:04:discovery</wsa:To>
        <wsdisco:AppSequence InstanceId="1" MessageNumber="1"/>
    </soap:Header>
    <soap:Body>
        <wsdisco:Hello>
            <wsa:EndpointReference>
                <wsa:Address>uuid:00000000-0000-1000-8000-000085123456</wsa:Address>
            </wsa:EndpointReference>
            <wsdisco:XAddrs>http://192.168.1.2:80/wsd/pnpx-metadata.cgi</wsdisco:XAddrs>
            <wsdisco:MetadataVersion>1</wsdisco:MetadataVersion>
        </wsdisco:Hello>
    </soap:Body>
</soap:Envelope>
```

FIG. 6B

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
    <soap:Header>
        <wsa:Action>http://schemas.xmlsoap.org/ws/2005/04/discovery/Hello</wsa:Action>
        <wsa:MessageID>uuid:15aa6190-1dd2-11b2-a2ac-000085123456</wsa:MessageID>
        <wsa:To>urn:schemas-xmlsoap-org:ws:2005:04:discovery</wsa:To>
        <wsdisco:AppSequence InstanceId="1" MessageNumber="1"/>
    </soap:Header>
    <soap:Body>
        <wsdisco:Hello>
            <wsa:EndpointReference>
                <wsa:Address>uuid:00000000-0000-1000-8000-000085000001</wsa:Address>
            </wsa:EndpointReference>
            <wsdisco:XAddrs>http://192.168.1.2:80/wsd/pnpx-metadata.cgi</wsdisco:XAddrs>
            <wsdisco:MetadataVersion>1</wsdisco:MetadataVersion>
        </wsdisco:Hello>
    </soap:Body>
</soap:Envelope>
```

FIG. 7A

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
  <soap:Header>
    <wsa:Action>http://schemas.xmlsoap.org/ws/2005/04/discovery/ProbeMatches</wsa:Action>
    <wsa:MessageID>uuid:cc45b4d0-1dd3-11b2-adbc-000085123456</wsa:MessageID>
    <wsa:RelatesTo>urn:uuid:ab663464-f787-45d9-8825-aaaaaa654321</wsa:RelatesTo>
    <wsa:To>http://schemas.xmlsoap.org/ws/2004/08/addressing/role/anonymous</wsa:To>
    <wsdisco:AppSequence InstanceId="1" MessageNumber="2"/>
  </soap:Header>
  <soap:Body>
    <wsdisco:ProbeMatches>
      <wsdisco:ProbeMatch>
        <wsa:EndpointReference>
          <wsa:Address>uuid:00000000-0000-1000-8000-000085123456</wsa:Address>
        </wsa:EndpointReference>
        <wsdisco:XAddrs>http://192.168.1.2:80/wsd/pnpx-metadata.cgi</wsdisco:XAddrs>
        <wsdisco:MetadataVersion>1</wsdisco:MetadataVersion>
      </wsdisco:ProbeMatch>
    </wsdisco:ProbeMatches>
  </soap:Body>
</soap:Envelope>
```

FIG. 7B

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
  <soap:Header>
    <wsa:Action>http://schemas.xmlsoap.org/ws/2005/04/discovery/ProbeMatches</wsa:Action>
    <wsa:MessageID>uuid:cc45b4d0-1dd3-11b2-adbc-000085123456</wsa:MessageID>
    <wsa:RelatesTo>urn:uuid:ab663464-f787-45d9-8825-aaaaaa654321</wsa:RelatesTo>
    <wsa:To>http://schemas.xmlsoap.org/ws/2004/08/addressing/role/anonymous</wsa:To>
    <wsdisco:AppSequence InstanceId="1" MessageNumber="2"/>
  </soap:Header>
  <soap:Body>
    <wsdisco:ProbeMatches>
      <wsdisco:ProbeMatch>
        <wsa:EndpointReference>
          <wsa:Address>uuid:00000000-0000-1000-8000-000085000001</wsa:Address>
        </wsa:EndpointReference>
        <wsdisco:XAddrs>http://192.168.1.2:80/wsd/pnpx-metadata.cgi</wsdisco:XAddrs>
        <wsdisco:MetadataVersion>1</wsdisco:MetadataVersion>
      </wsdisco:ProbeMatch>
    </wsdisco:ProbeMatches>
  </soap:Body>
</soap:Envelope>
```

FIG. 8A

```
<soap:Envelope xmlns:soap="http://www.w3.org/2003/05/soap-envelope"
  xmlns:wsa="http://schemas.xmlsoap.org/ws/2004/08/addressing"
  xmlns:mex="http://schemas.xmlsoap.org/ws/2004/09/mex"
  xmlns:wsdp="http://schemas.xmlsoap.org/ws/2006/02/devprof"
  xmlns:wprt="http://schemas.microsoft.com/windows/2006/08/wdp/print"
  xmlns:pnpx="http://schemas.microsoft.com/windows/pnpx/2005/10">
  <soap:Header>
    <wsa:Action>http://schemas.xmlsoap.org/ws/2004/09/transfer/GetResponse</wsa:Action>
      <wsa:MessageID>uuid:15b69690-1dd2-11b2-a80c-000085123456</wsa:MessageID>
      <wsa:RelatesTo>urn:uuid:e973a8e1-1564-42f8-97df-aaaaaa654321</wsa:RelatesTo>
      <wsa:To>http://schemas.xmlsoap.org/ws/2004/08/addressing/role/anonymous</wsa:To>
  </soap:Header>
  <soap:Body>
    <mex:Metadata>
      <mex:MetadataSection Dialect="http://schemas.xmlsoap.org/ws/2006/02/devprof/ThisDevice">
        <wsdp:ThisDevice>
          <wsdp:FriendlyName xml:lang="en-US">XXX series_123456</wsdp:FriendlyName>
          <wsdp:FirmwareVersion>1.000</wsdp:FirmwareVersion>
          <wsdp:SerialNumber>000000123456</wsdp:SerialNumber>               A01
        </wsdp:ThisDevice>
      </mex:MetadataSection>
      <mex:MetadataSection Dialect="http://schemas.xmlsoap.org/ws/2006/02/devprof/ThisModel">
        <wsdp:ThisModel>
          <wsdp:Manufacturer xml:lang="en-US">XXX</wsdp:Manufacturer>
          <wsdp:ManufacturerUrl>http://xxx.jp</wsdp:ManufacturerUrl>
          <wsdp:ModelName xml:lang="en-US">XXX series</wsdp:ModelName>
          <wsdp:ModelNumber>XXX series</wsdp:ModelNumber>
          <wsdp:ModelUrl>http://xxx.jp</wsdp:ModelUrl>
          <wsdp:PresentationUrl>http://192.168.1.2:80/index.html</wsdp:PresentationUrl>   ~A02
          <pnpx:DeviceCategory>Printers</pnpx:DeviceCategory>
        </wsdp:ThisModel>
      </mex:MetadataSection>
      <mex:MetadataSection Dialect="http://schemas.xmlsoap.org/ws/2006/02/devprof/Relationship">
        <wsdp:Relationship Type="http://schemas.xmlsoap.org/ws/2006/02/devprof/host">
          <wsdp:Hosted>
            <wsa:EndpointReference>
              <wsa:Address>http://192.168.1.2:80/wsd/printservice.cgi</wsa:Address>   ~A03
            </wsa:EndpointReference>
            <wsdp:Types>wprt:PrinterServiceType</wsdp:Types>
            <wsdp:ServiceId>uri:schemas.xxx.com/Printer</wsdp:ServiceId>
            <pnpx:CompatibleId>http://schemas.microsoft.com/windows/2006/08/wdp/print/PrinterServiceType</pnpx:CompatibleId>
          </wsdp:Hosted>
        </wsdp:Relationship>
      </mex:MetadataSection>
    </mex:Metadata>
  </soap:Body>
</soap:Envelope>
```

FIG. 8B

```
<soap:Envelope xmlns:soap="http://www.w3.org/2003/05/soap-envelope"
  xmlns:wsa="http://schemas.xmlsoap.org/ws/2004/08/addressing"
  xmlns:mex="http://schemas.xmlsoap.org/ws/2004/09/mex"
  xmlns:wsdp="http://schemas.xmlsoap.org/ws/2006/02/devprof"
  xmlns:wprt="http://schemas.microsoft.com/windows/2006/08/wdp/print"
  xmlns:pnpx="http://schemas.microsoft.com/windows/pnpx/2005/10">
  <soap:Header>
      <wsa:Action>http://schemas.xmlsoap.org/ws/2004/09/transfer/GetResponse</wsa:Action>
          <wsa:MessageID>uuid:15b69690-1dd2-11b2-a80c-000085123456</wsa:MessageID>
          <wsa:RelatesTo>urn:uuid:e973a8e1-1564-42f8-97df-aaaaaa654321</wsa:RelatesTo>
          <wsa:To>http://schemas.xmlsoap.org/ws/2004/08/addressing/role/anonymous</wsa:To>
  </soap:Header>
  <soap:Body>
     <mex:Metadata>
        <mex:MetadataSection Dialect="http://schemas.xmlsoap.org/ws/2006/02/devprof/ThisDevice">
           <wsdp:ThisDevice>
              <wsdp:FriendlyName xml:lang="en-US">XXX series_Master</wsdp:FriendlyName>
              <wsdp:FirmwareVersion>1.000</wsdp:FirmwareVersion>
              <wsdp:SerialNumber>000000123456</wsdp:SerialNumber>              B01
           </wsdp:ThisDevice>
        </mex:MetadataSection>
        <mex:MetadataSection Dialect="http://schemas.xmlsoap.org/ws/2006/02/devprof/ThisModel">
           <wsdp:ThisModel>
              <wsdp:Manufacturer xml:lang="en-US">XXX</wsdp:Manufacturer>
              <wsdp:ManufacturerUrl>http://xxx.jp</wsdp:ManufacturerUrl>
              <wsdp:ModelName xml:lang="en-US">XXX series</wsdp:ModelName>
              <wsdp:ModelNumber>XXX series</wsdp:ModelNumber>
              <wsdp:ModelUrl>http://xxx.jp</wsdp:ModelUrl>
              <wsdp:PresentationUrl>http://192.168.1.2:80/index-master.html</wsdp:PresentationUrl>
              <pnpx:DeviceCategory>Printers</pnpx:DeviceCategory>
           </wsdp:ThisModel>                                                   B02
        </mex:MetadataSection>
        <mex:MetadataSection Dialect="http://schemas.xmlsoap.org/ws/2006/02/devprof/Relationship">
           <wsdp:Relationship Type="http://schemas.xmlsoap.org/ws/2006/02/devprof/host">
              <wsdp:Hosted>
                 <wsa:EndpointReference>
                    <wsa:Address>http://192.168.1.2:80/wsd/masterservice.cgi</wsa:Address>
                 </wsa:EndpointReference>
                 <wsdp:Types>wprt:PrinterServiceType</wsdp:Types>              B03
                 <wsdp:ServiceId>uri:schemas.xxx.com/Printer</wsdp:ServiceId>
                    <pnpx:CompatibleId>http://schemas.microsoft.com/windows/2006/08/wdp/print/PrinterServiceType</pnpx:CompatibleId>
              </wsdp:Hosted>
           </wsdp:Relationship>
        </mex:MetadataSection>
     </mex:Metadata>
  </soap:Body>
</soap:Envelope>
```

FIG. 12A

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
  <soap:Header>
    <wsa:Action>http://schemas.xmlsoap.org/ws/2005/04/discovery/Hello</wsa:Action>
    <wsa:MessageID>uuid:15aa6190-1dd2-11b2-a2ac-000085123456</wsa:MessageID>
    <wsa:To>urn:schemas-xmlsoap-org:ws:2005:04:discovery</wsa:To>
    <wsdisco:AppSequence InstanceId="1" MessageNumber="1"/>
  </soap:Header>
  <soap:Body>
    <wsdisco:Hello>
      <wsa:EndpointReference>
        <wsa:Address>uuid:00000000-0000-1000-8000-000085123456</wsa:Address>
      </wsa:EndpointReference>
      <wsdisco:XAddrs>http://192.168.1.2:80/wsd/pnpx-metadata.cgi</wsdisco:XAddrs>
      <wsdisco:MetadataVersion>1</wsdisco:MetadataVersion>
    </wsdisco:Hello>
  </soap:Body>
</soap:Envelope>
```

FIG. 12B

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
  <soap:Header>
    <wsa:Action>http://schemas.xmlsoap.org/ws/2005/04/discovery/Hello</wsa:Action>
    <wsa:MessageID>uuid:15aa6190-1dd2-11b2-a2ac-000085123456</wsa:MessageID>
    <wsa:To>urn:schemas-xmlsoap-org:ws:2005:04:discovery</wsa:To>
    <wsdisco:AppSequence InstanceId="1" MessageNumber="1"/>
  </soap:Header>
  <soap:Body>
    <wsdisco:Hello>
      <wsa:EndpointReference>
        <wsa:Address>uuid:00000000-0000-1000-8000-000085000001</wsa:Address>
      </wsa:EndpointReference>
      <wsdisco:XAddrs>http://192.168.1.2:80/wsd/pnpx-metadata.cgi</wsdisco:XAddrs>
      <wsdisco:MetadataVersion>1</wsdisco:MetadataVersion>
    </wsdisco:Hello>
  </soap:Body>
</soap:Envelope>
```

FIG. 12C

```
<soap:Envelope xmlns:soap="http://www.w3.org/2003/05/soap-envelope"
  xmlns:wsa="http://schemas.xmlsoap.org/ws/2004/08/addressing"
  xmlns:wsdisco="http://schemas.xmlsoap.org/ws/2005/04/discovery">
  <soap:Header>
    <wsa:Action>http://schemas.xmlsoap.org/ws/2005/04/discovery/Hello</wsa:Action>
    <wsa:MessageID>uuid:15aa6190-1dd2-11b2-a2ac-000085123456</wsa:MessageID>
    <wsa:To>urn:schemas-xmlsoap-org:ws:2005:04:discovery</wsa:To>
    <wsdisco:AppSequence InstanceId="1" MessageNumber="1"/>
  </soap:Header>
  <soap:Body>
    <wsdisco:Hello>
      <wsa:EndpointReference>
        <wsa:Address>uuid:00000000-0000-1000-8000-000085000002</wsa:Address>
      </wsa:EndpointReference>
      <wsdisco:XAddrs>http://192.168.1.2:80/wsd/pnpx-metadata.cgi</wsdisco:XAddrs>
      <wsdisco:MetadataVersion>1</wsdisco:MetadataVersion>
    </wsdisco:Hello>
  </soap:Body>
</soap:Envelope>
```

PRINTING APPARATUS AND PRINTING SYSTEM

BACKGROUND OF THE INVENTION

1. Field of the Invention

The present invention relates to a printing apparatus and printing system. Particularly, the present invention relates to a printing apparatus that is connected to a network and performs communication using a multicast packet according to, for example, the WSD protocol, and a printing system.

2. Description of the Related Art

Today, an increasing number of network-compatible devices promote standardizing the specifications of communication protocols between devices on a network, device discovery mechanisms, device installation mechanisms, and various services such as printing and scanning. Such standardization is also extended to communication protocols for more versatilely exploiting network devices from client PCs, and services for more easily using devices. Examples of such protocols and services are WSD (Web Service for Devices) and UPnP (Universal Plug & Play)®.

WSD is a standard specification defined to respond to requests for various kinds of services using devices. WSD provides standard communication protocols, printing services, and scanning services basically using the Web service architecture. WSD uses standard network communication protocols based on Web services so that devices can be interconnected. As Web service components for devices, WSD defines specifications including device "DISCOVERY", device "DESCRIPTION", device "CONTROL", and device "EVENTING".

A device driver can be easily installed into a PnP-X client PC using PnP-X (Plug and Play eXtensions) available from Microsoft, Inc. for devices connected via a network. Conventional PnP (Plug and Play) is a function that acts when respective devices and client PCs are connected to various local I/O ports directly via cables or connectors. In PnP, a device transmits a device name (device ID), vendor name (vendor ID), serial number, and the like to a host PC. By referring to these received pieces of information, the host PC can automatically install, in the client, a device driver for using the device.

Similar to WSD, UPnP is also a standard specification defined to respond to requests for a variety of services using devices. UPnP provides standardized communication protocols, printing services, scanning services, AV device control services, and the like. UPnP defines specifications such as device "DISCOVERY", device "DESCRIPTION", device "CONTROL", and device "EVENTING".

Organizations such as the DLNA are studying compatibility to ensure interconnection between devices using UPnP. UPnP is now employed in many AV devices, home electrical appliances, and network devices in addition to PCs.

Relationship between WSD Communication Protocol and Printing Service

The WSD printing service is provided using a "SendDocument" command for transmitting print data, and "GetPrinterElements" for acquiring printer status information. Printing can be executed using a combination of these commands. These command processes are "CONTROL". "EVENTING" is a mechanism for notifying the host of an even that has occurred in a device. The host issues a "SUBSCRIBE" command for an event to be acquired, and registers an access destination in the host for the event. If the registered event occurs, the device notifies the registered host of the event. Commands and events are transmitted/received using HTTP on TCP/IP, and SOAP (Simple Object Access Protocol) on HTTP. Various commands are executed by transmitting/receiving the commands of a service described in XML on SOAP. Messages used in "DISCOVERY" are transmitted/received using SOAP on UDP which is one of the standard communication protocols. Messages are exchanged by transmitting/receiving messages described in XML on SOAP. This is called SOAP-Over-UDP communication.

Relationship between UPnP Communication Protocol and Printing Service

The UPnP printing service is executed by transmitting a command defined in the printing service to a target address. "EVENTING" is a mechanism to notify the host of an event that has occurred in a device. More specifically, the host issues a "SUBSCRIBE" command for an event to be acquired, and registers an access destination in the host for the event. If the registered event occurs, the device notifies the registered host of the event. Commands and events are transmitted/received using HTTP on the TCP/IP, and SOAP on HTTP. Various commands are executed by transmitting/receiving the commands of a service described in XML on SOAP. UPnP differs from WSD in that UPnP has a function of periodically notifying the device status using SSDP. In UPnP, the latest device connection state can be obtained by receiving the SSDP message.

As the mechanism of notifying another device of the status of a given device, these protocols standardize a mechanism of notifying the device status in response to transmission of event data or a status inquiry, as described above. An apparatus using this mechanism is, for example, a printer that complies with the WSD protocol and notifies a host PC of information such as a paper out error by eventing. Another example is a printer that complies with the WSD protocol and sends a status such as a paper out error in response to a status inquiry.

In contrast, there is a technique of notifying not a specific host but many network-connected hosts of the device status, unlike the foregoing eventing mechanism and status response mechanism. For example, techniques described in the following three patent publications are known. Japanese Patent Laid-Open No. 2006-202210 describes an arrangement in which when an expansion device is added to newly add a function to a device compliant with the UPnP protocol, the device adds service information about the added function to its basic service information and discloses it on the network. In Japanese Patent Laid-Open No. 2007-066092, temporary identification information is set in advance in a client and device for the purpose of automatic installation of only an intended network device. The device adds the identification information to a "Hello" message which is a network connection message defined by the WSD protocol. Then, the device transmits the resultant "Hello" message. The client recognizes only the "Hello" message containing the identification information. Japanese Patent Laid-Open No. 2007-122376 discloses an arrangement in which when a client receives, from a printer, a "Bye" message defined by the WSD protocol, it determines the cause (for example, sleep, malfunction, or offline) of the "Bye" message and changes the type of printer icon.

However, the mechanism of notifying the device status in response to eventing or a status inquiry, which is standardized in the WSD and UPnP protocols, is not suitable for notifying many unspecified network-connected hosts of the device status.

More specifically, according to the eventing method, the client needs to know, from pre-registration or the like, a host device to which the client is to transmit an event. The client cannot notify unspecified hosts of the device status. The eventing method is premised on one-to-one communication. Thus, when notifying many hosts of the device status, the client needs to repeat eventing by the number of hosts to communicate with. This increases the network traffic and complicates processing.

The status response method is a mechanism of inquiring the status of a specific device from a peripheral. To know a change of the device status, as needed, polling for a status inquiry needs to be done. This method therefore complicates processing and increases the network traffic when there are many peripherals.

To solve the problems when notifying many unspecified hosts of the device status using the WSD or UPnP protocol, a network connection message in WSD or UPnP may be applied. According to this method, when the device status changes, the network connection message is reissued, and a status to be notified is described in device information which is sent back after "DISCOVERY". This example is a technique disclosed in Japanese Patent Laid-Open No. 2006-202210. In this method, however, to notify a peripheral of the status of a given device, the peripheral needs to issue an inquiry to the device upon receiving a network connection message. After issuing the network connection message, inquiries are concentrated, increasing the network traffic.

As a technique of notifying many unspecified hosts of the device status while solving these problems, methods disclosed in Japanese Patent Laid-Open Nos. 2007-066092 and 2007-122376 are also proposed. According to these methods, a standardized network connection or disconnect message is proprietarily extended. The device status is saved in the extended message and transmitted. These methods can notify many unspecified devices of the status using one packet because the status is notified using the network connection or disconnect message which is a multicast packet. In other words, these methods can prevent an increase in network traffic. However, these methods require verification of connection to confirm that no malfunction occurs in an apparatus incompliant with a proprietarily extended packet.

SUMMARY OF THE INVENTION

Accordingly, the present invention is conceived as a response to the above-described disadvantages of the conventional art.

For example, a printing apparatus and printing system according to this invention are capable of confirming the statuses of many unspecified apparatuses without increasing the network traffic.

According to one aspect of the present invention, preferably, there is provided a printing apparatus capable of communicating with another printing apparatus and a host computer via a network in accordance with a predetermined protocol, the printing apparatus comprising: a decision unit configured to decide, in accordance with an instruction from a user or autonomously, that the printing apparatus itself is a master printer among a plurality of printing apparatuses, connected to the network, including the printing apparatus itself and; a notifying unit configured to, when the decision unit decides that the printing apparatus itself is a master printer, generate an identifier indicating that the printing apparatus itself is the master printer, and notify the other printing apparatus and the host computer, by using a multicast packet containing the identifier, that the printing apparatus itself is the master printer; a transmission unit configured to transmit, in response to a request from the other printing apparatus or the host computer, meta data to the other printing apparatus or the host computer that has issued the request; a configuration unit configured to, when the decision unit decides that the printing apparatus itself is not a master printer, configure the printing apparatus itself to receive a multicast packet from the other printing apparatus operating as a master printer; a determination unit configured to determine whether or not the identifier contained in the received multicast packet matches an identifier, which is held in the printing apparatus itself and indicates the master printer; a request unit configured to, when the determination unit determines that the received identifier matches the identifier indicating the master printer, request meta data of the other printing apparatus operating as the master printer; and a reception unit configured to receive the meta data transmitted in response to the request from the request unit.

According to another aspect of the present invention, preferably, there is provided a printing system in which a first printing apparatus and a first host computer are connected via a network in accordance with a predetermined protocol, wherein the first printing apparatus includes: a decision unit configured to decide, in accordance with an instruction from a user or autonomously, that the first printing apparatus is a master printer among a plurality of printing apparatuses, connected to the network, including the first printing apparatus and; a notifying unit configured to, when the decision unit decides that the first printing apparatus is a master printer, generate an identifier indicating that the first printing apparatus is the master printer, and notify a second printing apparatus and the first host computer, by using a multicast packet containing the identifier, that the first printing apparatus is the master printer; a transmission unit configured to transmit, in response to a request from the second printing apparatus or the first host computer, meta data to the second printing apparatus or the first host computer that has issued the request; a configuration unit configured to, when the decision unit decides that the first printing apparatus is not a master printer, configure the first printing apparatus to receive a multicast packet from the second printing apparatuses operating as a master printer; a determination unit configured to determine whether or not the identifier contained in the received multicast packet matches an identifier, which is held in the first printing apparatus and indicates the master printer; a request unit configured to, when the determination unit determines that the received identifier matches the identifier indicating the master printer, request meta data of the second printing apparatus operating as the master printer; and a reception unit configured to receive the meta data transmitted in response to the request from the request unit, and the first host computer includes: a request unit configured to request metadata of a printing apparatus operating as the master printer in accordance with the multicast packet notified by the notifying unit; and a display unit configured to receive the meta data transmitted in response to the request from the request unit, and displaying, based on the received meta data, an icon representing a status of the printing apparatus which has transmitted the meta data.

According to still another aspect of the present invention, preferably, there is provided a computer readable medium which stores a computer program to be executed in a computer, the computer program executing a function in each unit recited in the above-identified printing apparatus.

The invention is particularly advantageous since many unspecified apparatuses can be notified of the status of each network-connected apparatus using one packet without increasing the network traffic. The status is notified in accordance with a predetermined protocol, so connection to an apparatus need not be verified.

In addition, a receiving apparatus which receives a multicast packet requests meta data and acquires it in response to the request. Only if necessary, meta data is acquired without creating unwanted network traffic.

Further features of the present invention will become apparent from the following description of exemplary embodiments (with reference to the attached drawings).

BRIEF DESCRIPTION OF THE DRAWINGS

FIG. 5 is a chart showing transmission and reception of data between two printing apparatuses and one PC via a network.

FIGS. 6A and 6B are views each exemplifying a "Hello" multicast packet issued when the printing apparatus operates as a client or master printer.

FIGS. 7A and 7B are views each exemplifying a "Probe-Matches" packet sent back when the printing apparatus operates as a client or master printer;

FIGS. 8A and 8B are views each exemplifying meta data sent back in response to a meta data acquisition request when the printing apparatus operates as a client or master printer;

FIGS. 12A, 12B, and 12C are views exemplifying "Hello" multicast packets issued when the PC executes three different operations.

DESCRIPTION OF THE EMBODIMENTS

An exemplary embodiment of the present invention will now be described in detail in accordance with the accompanying drawings.

Figure 1:
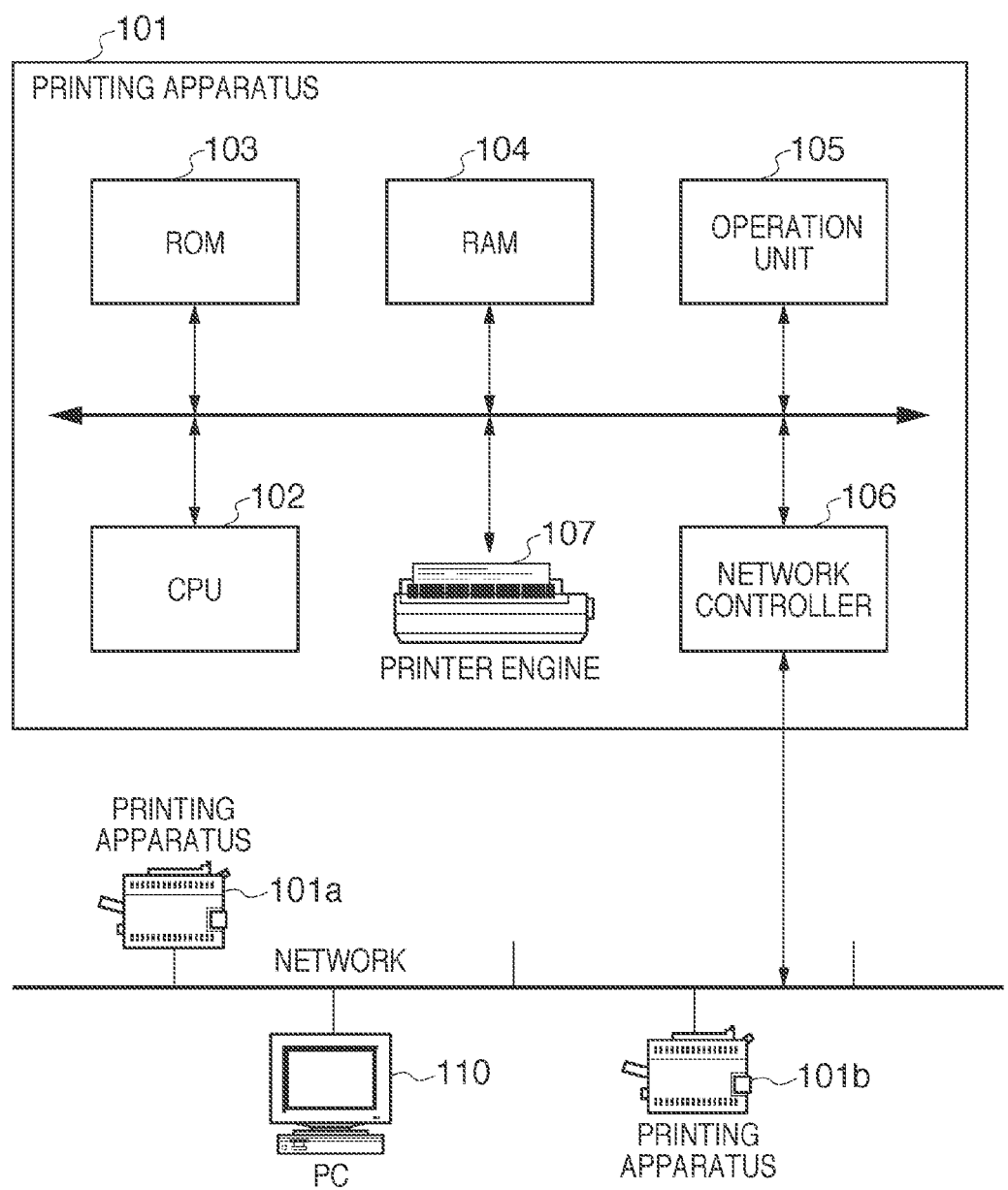
FIG. 1 is a view showing the schematic hardware configuration of a printing system as an exemplary embodiment of the present invention.

FIG. 1 is a view showing the schematic hardware configuration of a printing system as an exemplary embodiment of the present invention. As shown in FIG. 1, a printing apparatus 101 includes a printer engine 107, CPU 102, ROM 103, RAM 104, operation unit 105, and network controller 106. The printing apparatus 101 is connected to a network via the network controller 106, and can communicate with a plurality of network-connected devices. Other printing apparatuses 101a and 101b which employ the embodiment are connected to the network. A PC (host computer) 110 is also connected to the network. Note that the network is an Ethernet® LAN in the embodiment, but may be another LAN such as a wireless LAN.

Figure 2:
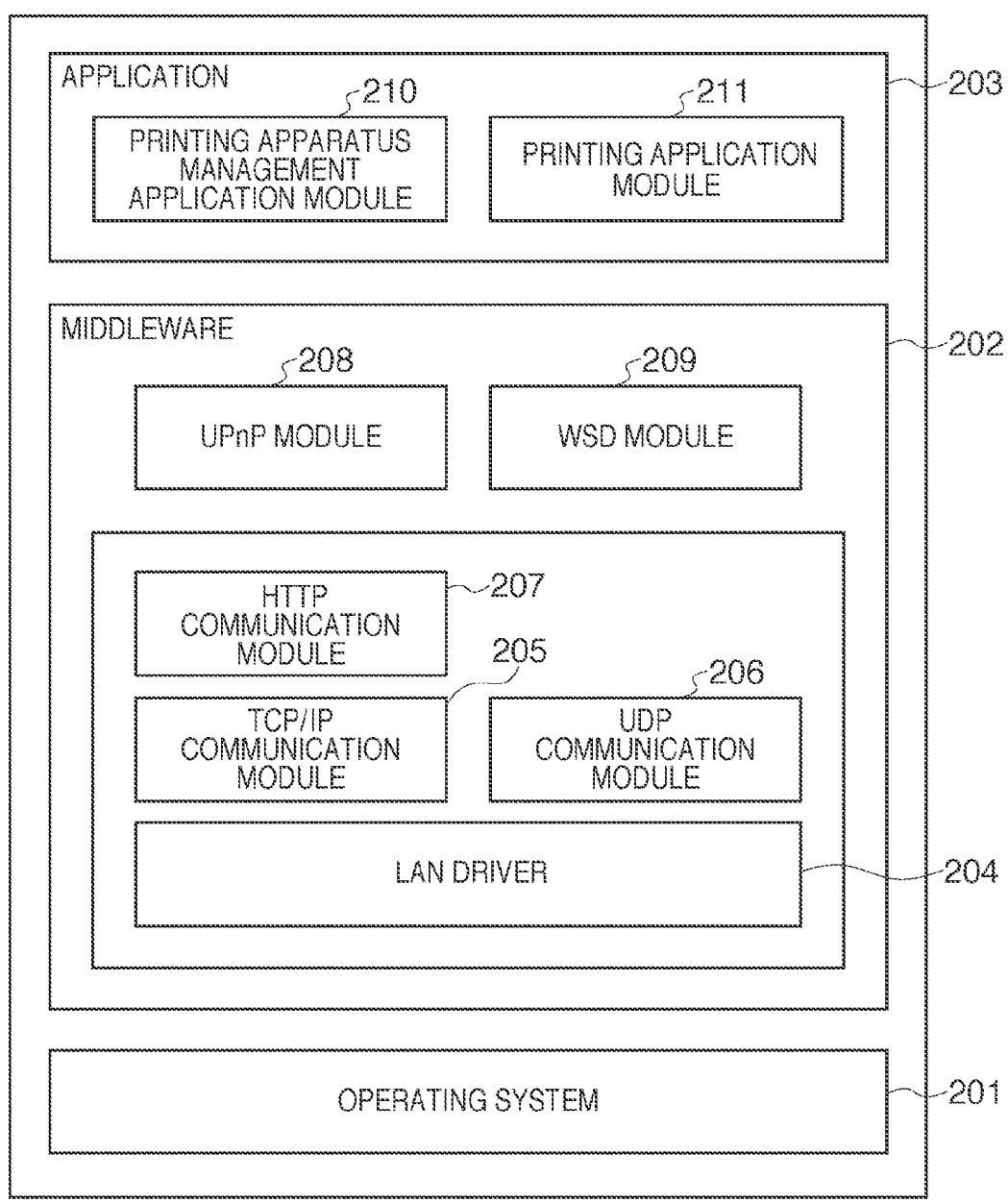
FIG. 2 is a block diagram showing the schematic software configuration of the printing apparatus.

FIG. 2 is a block diagram showing the schematic software configuration of the printing apparatus. As shown in FIG. 2, the printing apparatus 101 is configured such that each software module runs on an operating system 201. Middleware 202 responsible for network communication runs on the operating system 201. An application program 203 using data transmitted/received via the network runs on a layer higher than the middleware 202.

The middleware 202 is divided into several layers. On the lowest layer, a LAN driver 204 runs to control the network controller 106. On a layer higher than the LAN driver 204, a TCP/IP communication module 205, UDP communication module 206, and HTTP communication module 207 run to control the basic communication protocols of the network. On a layer higher than them, a UPnP module 208 and WSD module 209 run to control the UPnP protocol and WSD protocol using the communication protocols of the modules 205, 206, and 207.

The application program (to be referred to as a program) 203 includes a printing application module 211 which prints using the UPnP protocol and WSD protocol. In the embodiment, a printing apparatus management application module 210 runs to manage various behaviors of the printing apparatus 101 on the network.

When the printing apparatus 101 is decided as a master printer according to a predetermined method, the printing apparatus management application module 210 manages the statuses of the network-connected printing apparatuses 101a and 101b having similar configurations. The predetermined method is, for example, an instruction input by a user operation via the operation unit 105, an autonomous decision algorithm, or a decision method based on negotiations with a peripheral using a network protocol.

For example, when the printing apparatus 101 is decided as a master printer by the predetermined method, it notifies the connected network that the printing apparatus 101 becomes a master printer. When the network-connected printing apparatuses 101a and 101b having similar configurations detect which apparatus serves as a master printer on the network, they properly transmit their status information to the master printer by some means. The master printer collects received pieces of status information, and presents the analysis result to the user for each apparatus or at once using a Web page or some other means. The printing apparatus management application module 210 manages processing of the master printer and processing of the client which transmits status information.

In the embodiment, the arrangement of the present invention is applied to processing of notifying or detecting the status of the master printer on the network.

Figure 3:
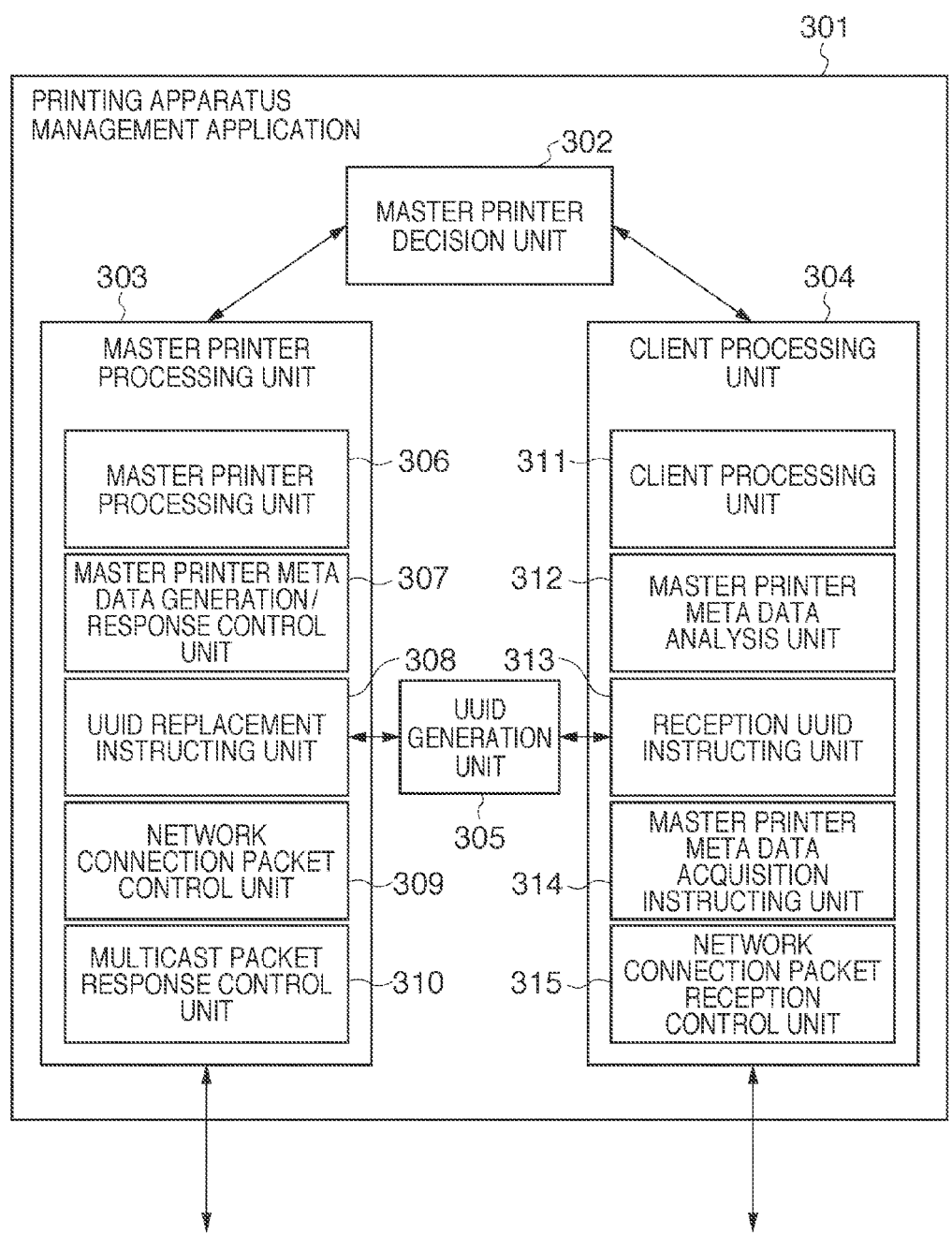
FIG. 3 is a block diagram showing the functional arrangement of a printing apparatus management application module 210.

FIG. 3 is a block diagram showing the functional arrangement of the printing apparatus management application module 210. Based on a predetermined instruction input by a user operation via the operation unit 105, a master printer decision unit 302 decides whether or not the printing apparatus 101 is a master printer, as described above. Whether the printing apparatus 101 is a master printer or not may also be decided in accordance with an autonomous decision algorithm, or negotiations with a peripheral using a network protocol. If the printing apparatus 101 is decided as a master printer, a master printer processing unit 303 executes processing. If the printing apparatus 101 is not decided as a master printer, a client processing unit 304 executes processing.

The master printer processing unit 303 includes a master printer processing unit 306, master printer meta data generation/response control unit 307, UUID replacement instructing unit 308, network connection packet control unit 309, and multicast packet response control unit 310. The client processing unit 304 includes a client processing unit 311, master printer meta data analysis unit 312, reception UUID instructing unit 313, master printer meta data acquisition instructing unit 314, and network connection packet reception control unit 315. The master printer processing unit 303 and client processing unit 304 share a UUID generation unit 305.

Figure 4:
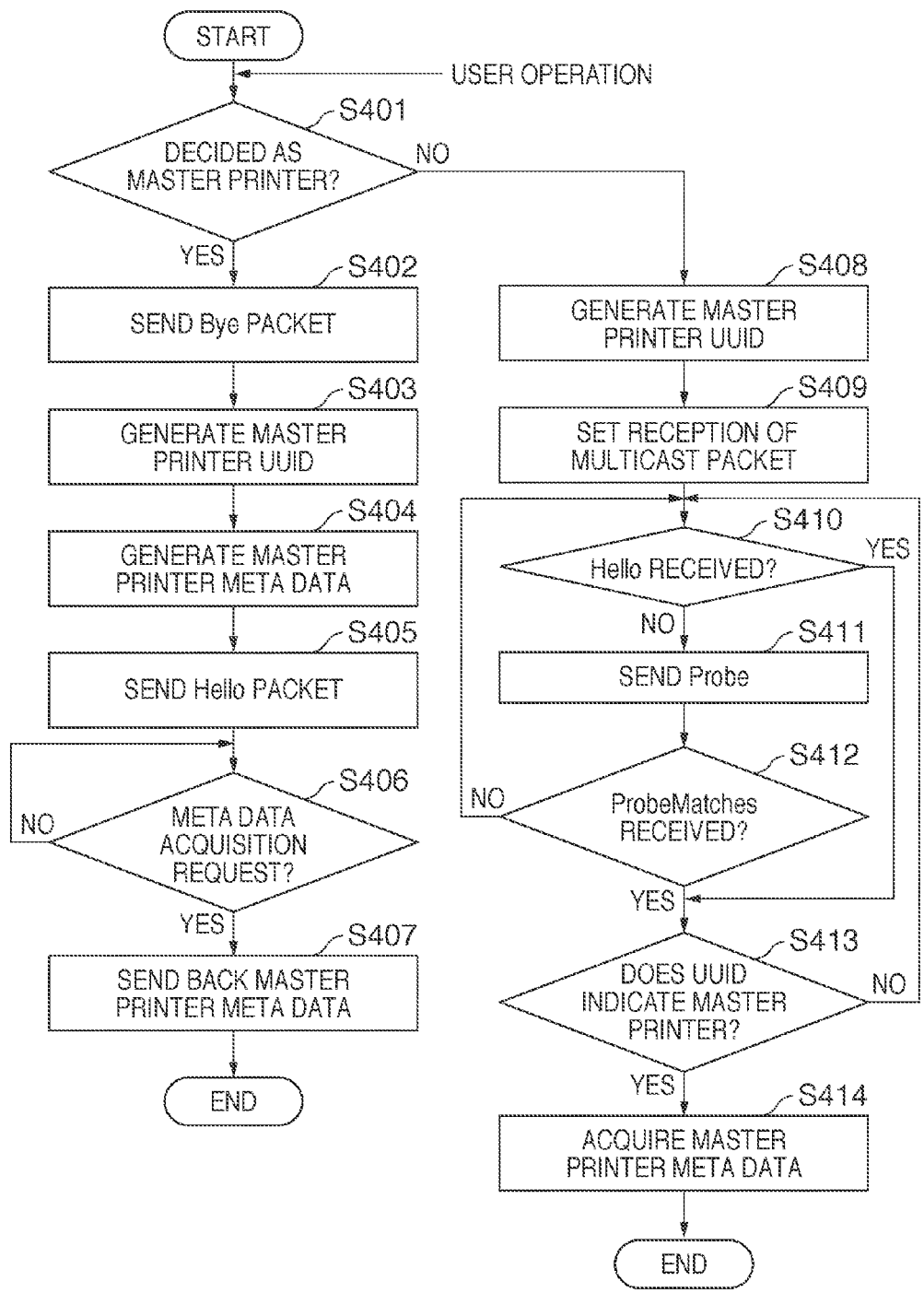
FIG. 4 is a flowchart showing an outline of the operation of the printing apparatus management application module 210 which employs the WSD protocol.

FIG. 4 is a flowchart showing an outline of the operation of the printing apparatus management application module 210 which employs the WSD protocol.

In step S401, the master printer decision unit 302 decides, based on an instruction accepted from the user, whether or not the printing apparatus 101 is a master printer. If the master printer decision unit 302 decides that the printing apparatus 101 is a master printer, the process advances to step S402, and the network connection packet control unit 309 in the master printer processing unit 303 sends a "Bye" multicast packet onto the network. By this processing, a printing apparatus which has performed conventional processing is disconnected from the network.

In step S403, the UUID generation unit 305 generates, according to a predetermined procedure, a UUID indicating that the printing apparatus 101 is a master printer. The UUID stands for a "Universally Unique IDentifier" which does not overlap another one. The Universally Unique IDentifier will be referred to as a UUID. In step S404, the master printer meta data generation/response control unit 307 generates in advance master printer meta data to be sent back in response to a meta data inquiry. The UUID replacement instructing unit 308 generates a "Hello" multicast packet which is a network connection message containing the UUID generated in step S403. The multicast packet is a communication scheme of simultaneously transmitting the same IP packet from one computer to a plurality of computers. In step S405, the network connection packet control unit 309 sends the generated "Hello" multicast packet onto the network. By this processing, the printing apparatus having the master printer UUID is connected to the network.

In step S406, the master printer meta data generation/response control unit 307 waits for a meta data acquisition request in preparation for a meta data inquiry from each network-connected apparatus. If the master printer meta data generation/response control unit 307 receives a meta data acquisition request, the process advances to step S407 to send back the master printer meta data generated in step S404.

As described above, when the printing apparatus in the embodiment operates as a master printer, it uses only a multicast packet defined in a standardized protocol to notify that the printing apparatus operates as a master printer. In this embodiment, it is decided based on a user instruction that the printing apparatus operates as a master printer. Instead, the printing apparatus itself may autonomously decide, in accordance with another algorithm or the like, that it operates as a master printer.

If the master printer decision unit 302 decides in step S401 that the printing apparatus 101 is not a master printer, the process advances to step S408, and processing in the client processing unit 304 is executed. In the client processing unit 304, the UUID generation unit 305 generates, according to a predetermined method, a UUID indicating a master printer. The UUID generated here is identical to that generated in step S403. In step S409, the reception UUID instructing unit 313 instructs the network connection packet reception control unit 315 to receive a "Hello" waiting cast packet which is a network connection message containing the generated UUID.

In step S410, the network connection packet reception control unit 315 receives the "Hello" packet, and the process advances to step S413 to determine whether or not the UUID contained in the packet matches one indicating the designated master printer. If the UUID contained in the "Hello" packet matches one indicating the master printer, the process advances to step S414, and the master printer meta data acquisition instructing unit 314 transmits a meta data acquisition request to the master printer. Then, meta data of the master printer is acquired and analyzed by the master printer meta data analysis unit 312, and the process prepares for subsequent status data transmission processing (not shown). If no "Hello" packet is received in step S410, the process advances to step S411, and the network connection packet reception control unit 315 periodically sends a "Probe" packet which is a network probe packet, without putting a load on the network. In step S412, it is determined whether or not the network connection packet reception control unit 315 has received a "ProbeMatches" UDP packet which is a response to the "Probe" packet. If the "ProbeMatches" UDP packet has been received, the process advances to step S413 to perform the same processing as that upon receiving the "Hello" packet. If no "ProbeMatches" UDP packet has been received, the process returns to step S410 to determine whether or not the "Hello" packet has been received.

As described above, when the printing apparatus according to the embodiment operates as a client, it can detect the presence of a master printer by using only a response UDP packet with respect to transmission of a multicast packet. Only if necessary, the printing apparatus transmits and receives meta data to and from the master printer. In this way, when the printing apparatus operates as a client, it acquires meta data only upon acquiring the "Hello" packet from the master printer.

Transmission and reception of data on the network when two printing apparatuses and one PC are connected to the network and one printing apparatus operates as a master printer will be explained.

FIG. 5 is a chart showing transmission and reception of data between two printing apparatuses and one PC via a network. Assume that the user designates printing apparatus A as a master printer and printing apparatus B is a client apparatus.

In FIG. 5, printing apparatus A sends a "Bye" multicast packet in step S402, as represented by 501. Subsequently, printing apparatus A sends a "Hello" multicast packet containing the master printer UUID in step S405, as represented by 502. Upon receiving the "Hello" multicast packet containing the master printer UUID in step S410, printing apparatus B transmits a meta data acquisition request to printing apparatus A in step S414, as represented by 503. In step S407, printing apparatus A responds to the meta data acquisition request from printing apparatus B, and sends back master printer meta data generated in step S404, as represented by 504.

Upon receiving the "Hello" multicast packet, the PC transmits a meta data acquisition request to printing apparatus A according to a standardized procedure, regardless of whether or not the "Hello" multicast packet contains the master printer UUID, as represented by 505. In step S407, printing apparatus A responds to the meta data acquisition request from the PC, and sends back master printer meta data generated in step S404, as represented by 506. In this fashion, the PC can automatically acquire meta data of the master printer in accordance with a standardized procedure.

If printing apparatus B has failed to receive the "Hello" packet, it periodically sends a "Probe" multicast packet in step S411, as represented by 507. Printing apparatus A responds to the received "Probe" multicast packet, and sends back a "ProbeMatches" UDP packet containing the UUID generated in step S403, as represented by 508. Upon receiving the "ProbeMatches" UDP packet containing the master printer UUID in step S412, printing apparatus B transmits a meta data acquisition request to printing apparatus A in step S414, as represented by 509. In step S407, printing apparatus A responds to the meta data acquisition request from printing apparatus B, and sends back master printer meta data generated in step S404, as represented by 510.

The PC sometimes sends a "Probe" multicast packet in a refresh operation or the like. In this case, printing apparatus A sends back a "ProbeMatches" UDP packet containing the master printer UUID. The PC transmits a meta data acquisition request to printing apparatus A according to a standardized procedure. Hence, the PC can automatically acquire meta data of the master printer in accordance with a standardized procedure even in a refresh operation or the like.

A method of generating a multicast packet containing the master printer UUID will be described with reference to FIGS. 6A to 8B.

FIGS. 6A and 6B are views each exemplifying a "Hello" multicast packet issued when the printing apparatus operates as a client or master printer.

FIG. 6A exemplifies a "Hello" multicast packet issued when the printing apparatus operates as a client. A UUID, which is an identifier contained in the packet and indicates the printing apparatus, is surrounded by a solid line. In this example, a UUID (character string "000085123456") indicating the MAC address of the network controller of the apparatus is used in the lower 12 digits of the UUID.

FIG. 6B exemplifies a "Hello" multicast packet issued when the printing apparatus becomes a master printer. A UUID, which is an identifier contained in the packet and indicates that the printing apparatus is a master printer, is surrounded by a solid line. In this example, a character string "000085000001" indicating that the apparatus is a master printer is used in the lower 12 digits of the UUID.

The character string "000085000001" indicating a master printer is generated by the UUID generation unit 305, and recognized commonly by a printing apparatus serving as a master printer and that serving as a client. In this example, a predetermined character string is generated. However, the character string may be generated dynamically in accordance with another algorithm or the like as long as the character string can be shared between a printing apparatus serving as a master printer and that serving as a client.

When a printing apparatus operating as a client receives a "Hello" packet shown in FIG. 6B that is sent from the master printer, it extracts the UUID (portion surrounded by the solid line) serving as an identifier indicating the master printer. The client examines in step S413 whether or not the UUID contains, in the lower 12 digits, the character string "000085000001" generated in advance by the UUID generation unit 305. If there is a match, the client acquires meta data of the master printer.

FIGS. 7A and 7B are views each exemplifying a "ProbeMatches" packet sent back when the printing apparatus operates as a client or master printer.

FIG. 7A exemplifies a "ProbeMatches" packet sent back in response to a "Probe" multicast packet when the printing apparatus operates as a client. A UUID, which is an identifier contained in the packet and indicates the printing apparatus, is surrounded by a solid line. In this example, a UUID (character string "000085123456") indicating the MAC address of the network controller of the apparatus is used in the lower 12 digits of the UUID. For example, the PC 110 transmits a "Probe" message to the printing apparatus operating as a client, and recognizes, from the response, that the printing apparatus operates as a client.

FIG. 7B exemplifies a "ProbeMatches" packet sent back when the printing apparatus becomes a master printer. A UUID, which is an identifier contained in the packet and indicates that the printing apparatus is a master printer, is surrounded by a solid line. In this example, a character string "000085000001" indicating that the apparatus is a master printer is used in the lower 12 digits of the UUID. The UUID generation unit 305 generates the character string "000085000001" indicating the master printer. This character string is identical to that contained in the "Hello" multicast packet shown in FIG. 6B.

When a printing apparatus operating as a client receives a "ProbeMatches" packet shown in FIG. 7B that is a response from the master printer, it extracts the UUID (portion surrounded by the solid line) serving as an identifier indicating the master printer. The client examines in step S413 whether or not the UUID contains, in the lower 12 digits, the character string "000085000001" generated in advance by the UUID generation unit 305. If there is a match, the client acquires meta data of the master printer.

FIGS. 8A and 8B are views each exemplifying meta data sent back in response to a meta data acquisition request when the printing apparatus operates as a client or master printer.

As shown in FIG. 8A, when the printing apparatus operates as a client, a name displayed when the PC discovers the printing apparatus is substituted into A01. Also, URL information capable of browsing information of the printing apparatus in the Web page format is substituted into A02. Access point information for transmitting a control command to the printing apparatus is substituted into A03.

As shown in FIG. 8B, when the printing apparatus operates as a master printer, a name displayed when the PC discovers the printing apparatus is substituted into B01. In B01, a portion changed from A01 is hatched. In B01, the name indicating a printing apparatus is replaced with a name "XXX Series_Master" indicating the master printer. URL information capable of browsing information of the printing apparatus in the Web page format is substituted into B02. In B02, a portion changed from A02 is hatched. In B02, the URL address is replaced with one indicating a master printer-dedicated homepage. Further, access point information for transmitting a control command to the printing apparatus is substituted into B03. In B03, a portion changed from A03 is hatched. In B03, the access point information is replaced with a URL address indicating a CGI access point for transmitting and receiving master printer-specific control commands.

When a printing apparatus operating as a client receives a meta data response shown in FIG. 8B from the master printer, it extracts CGI access point information in B03. Then, the client transmits and receives data to and from the master printer in accordance with a separately set means. Data transmitted and received via the CGI access point may be commands or data defined by a standard protocol. The data may also be commands or data compliant with a proprietary protocol set for the master printer.

When the PC receives meta data shown in FIG. 8B from the master printer, it extracts the master printer name from B01. The PC presents the extracted name as an icon name to the user. The PC extracts URL information of the Web page of the master printer from B02. The PC presents the URL information to the user. The user can easily browse the master printer information via the Web page. Even the PC user can easily recognize the presence of the master printer, and easily access the master printer.

Figure 9A:
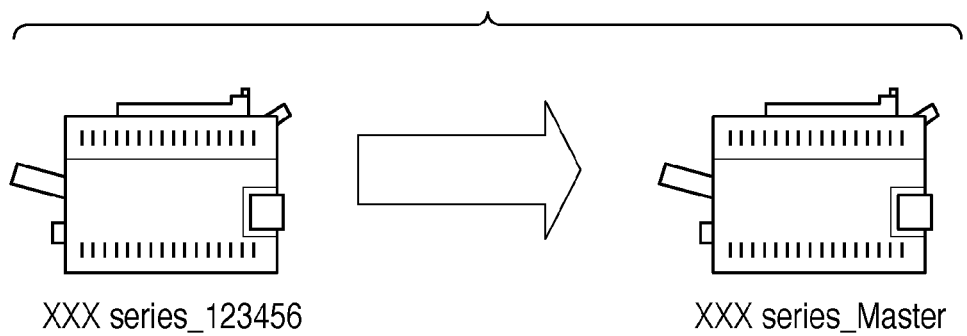
FIGS. 9A and 9B are views each exemplifying a change of the icon display state indicating a printing apparatus on a PC when the printing apparatus shifts from a state in which it operates as a client to a state in which it operates as a master printer.
Figure 9B:
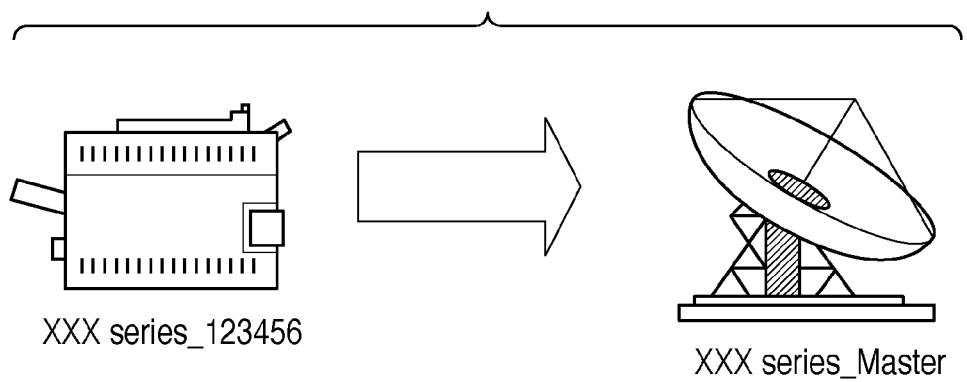

FIGS. 9A and 9B are views each exemplifying a change of the icon display state indicating a printing apparatus on a PC when the printing apparatus shifts from a state in which it operates as a client to a state in which it operates as a master printer.

While the printing apparatus operates as a client, an icon on the left side of FIG. 9A or 9B is displayed on the PC. As the printing apparatus name in this state, "XXX series__123456" substituted into A01 in FIG. 8A is displayed. When the printing apparatus becomes a master printer, meta data shown in FIG. 8B is acquired. At the same time, the name changes to "XXX series_Master" substituted into B01, and an icon on the right side of FIG. 9A is displayed.

If a meta data inquiry complying with the UPnP protocol (not shown) is received, icon data indicating a master printer (not shown) may be added to the response meta data in accordance with a method defined by the standard specifications of the UPnP protocol. In this case, the display on the PC changes from a default icon to an icon corresponding to the added icon data, like an icon on the right side of FIG. 9B.

According to the above-described embodiment, the printing apparatus can notify each network-connected apparatus that the printing apparatus has changed to become a master printer, without extending a multicast packet defined in standard specifications. Even when the printing apparatus operates as a client, it can detect the presence of a master printer by using only a response UDP packet defined in standard specifications with respect to transmission of a multicast packet. Only if necessary, the printing apparatus transmits and receives meta data to and from the master printer. Thus, no unwanted network traffic is generated.

Another Embodiment

Figure 10:
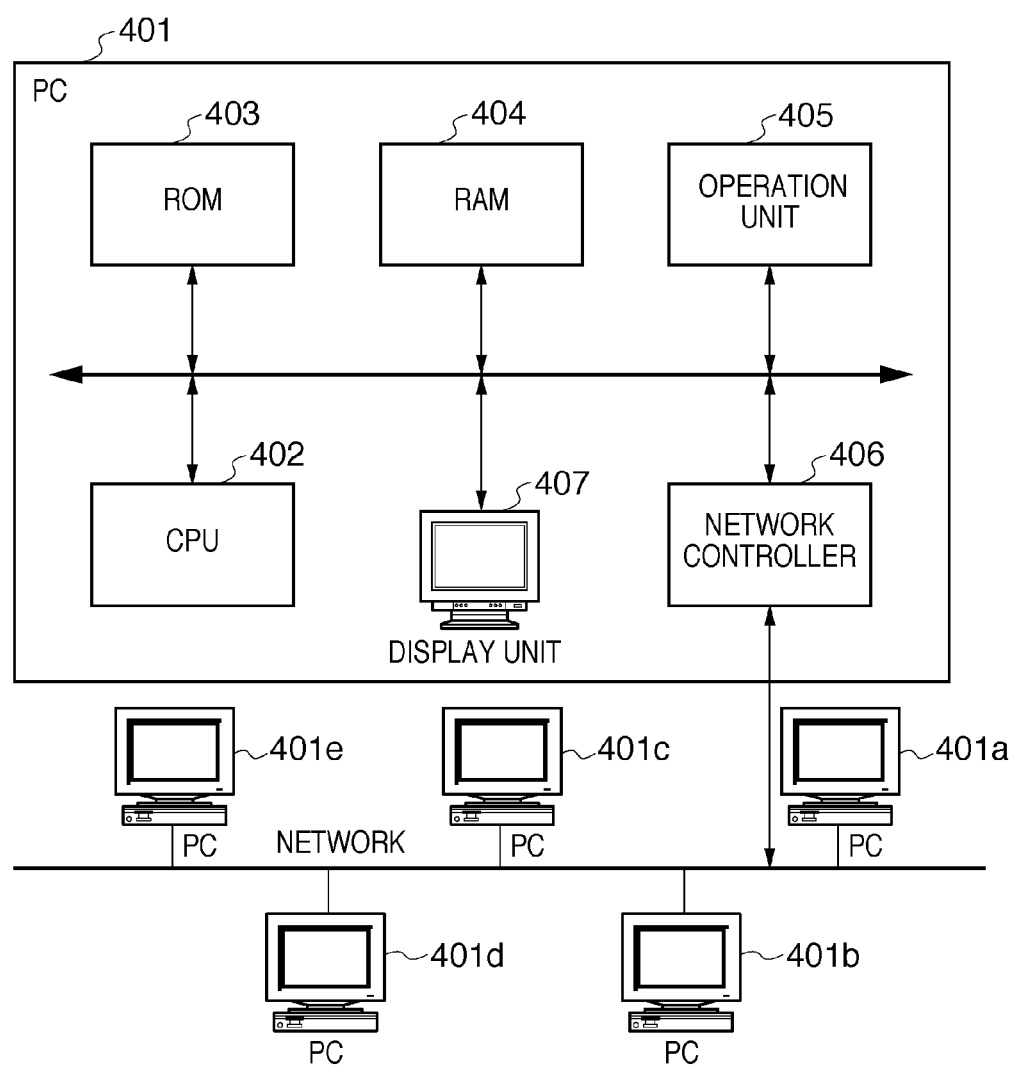
FIG. 10 is a view showing the schematic hardware configuration of a personal computer (PC) according to another embodiment.

FIG. 10 is a view showing the schematic hardware configuration of a personal computer (PC) according to another embodiment. As shown in FIG. 10, a PC 401 includes a CPU 402, ROM 403, RAM 404, operation unit 405, network controller 406, and display unit 407. The PC 401 is connected to a network via the network controller 406, and can communicate with a plurality of network-connected devices (PCs in FIG. 10). In the configuration shown in FIG. 10, five PCs 401a to 401e having configurations similar to that of the PC 401 are connected to the network. Note that the network is an Ethernet® LAN in the embodiment, but may be another LAN such as a wireless LAN.

Figure 11A:
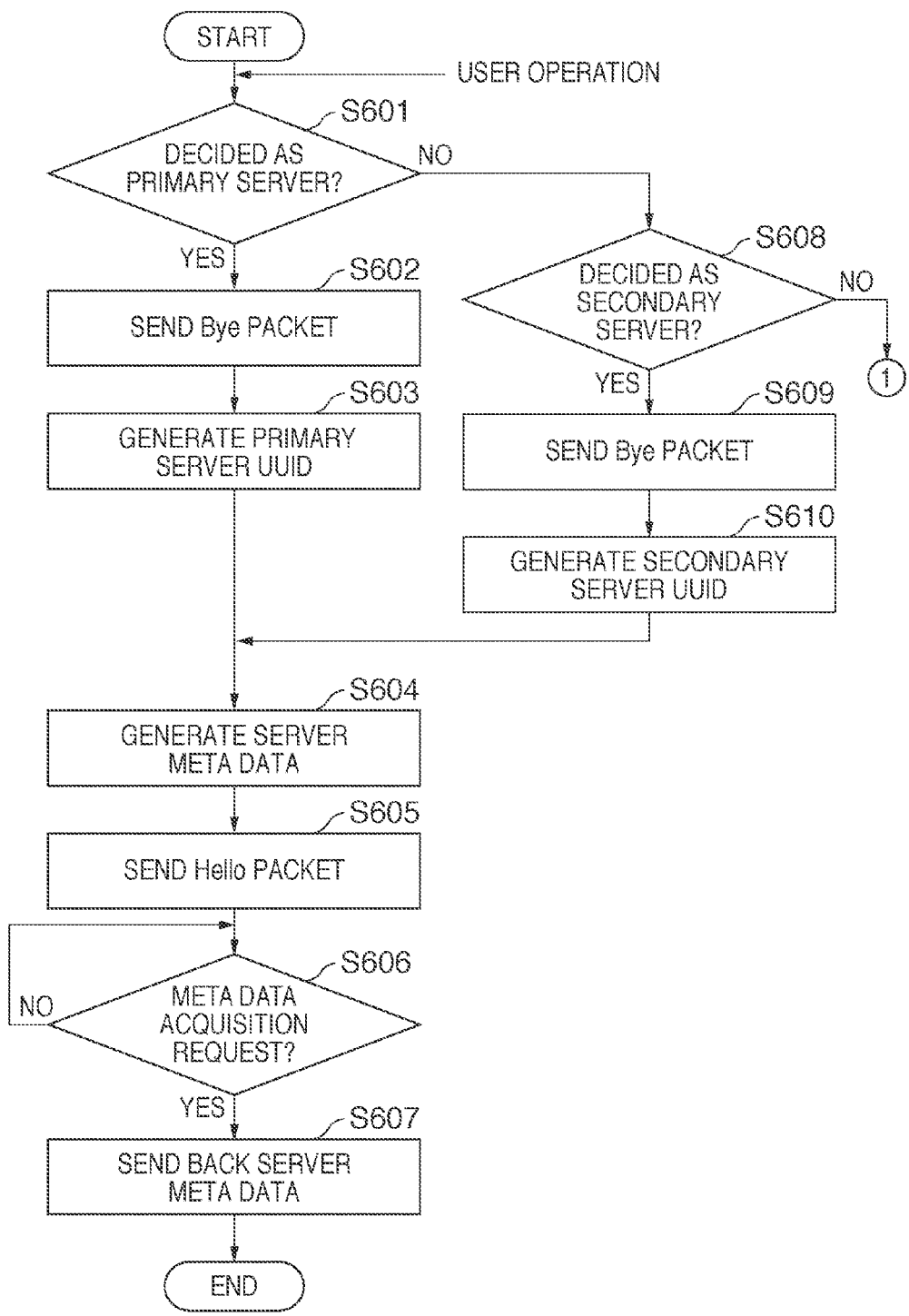
FIGS. 11A and 11B are flowcharts for explaining the operation of a PC 401 which employs the WSD protocol.
Figure 11B:
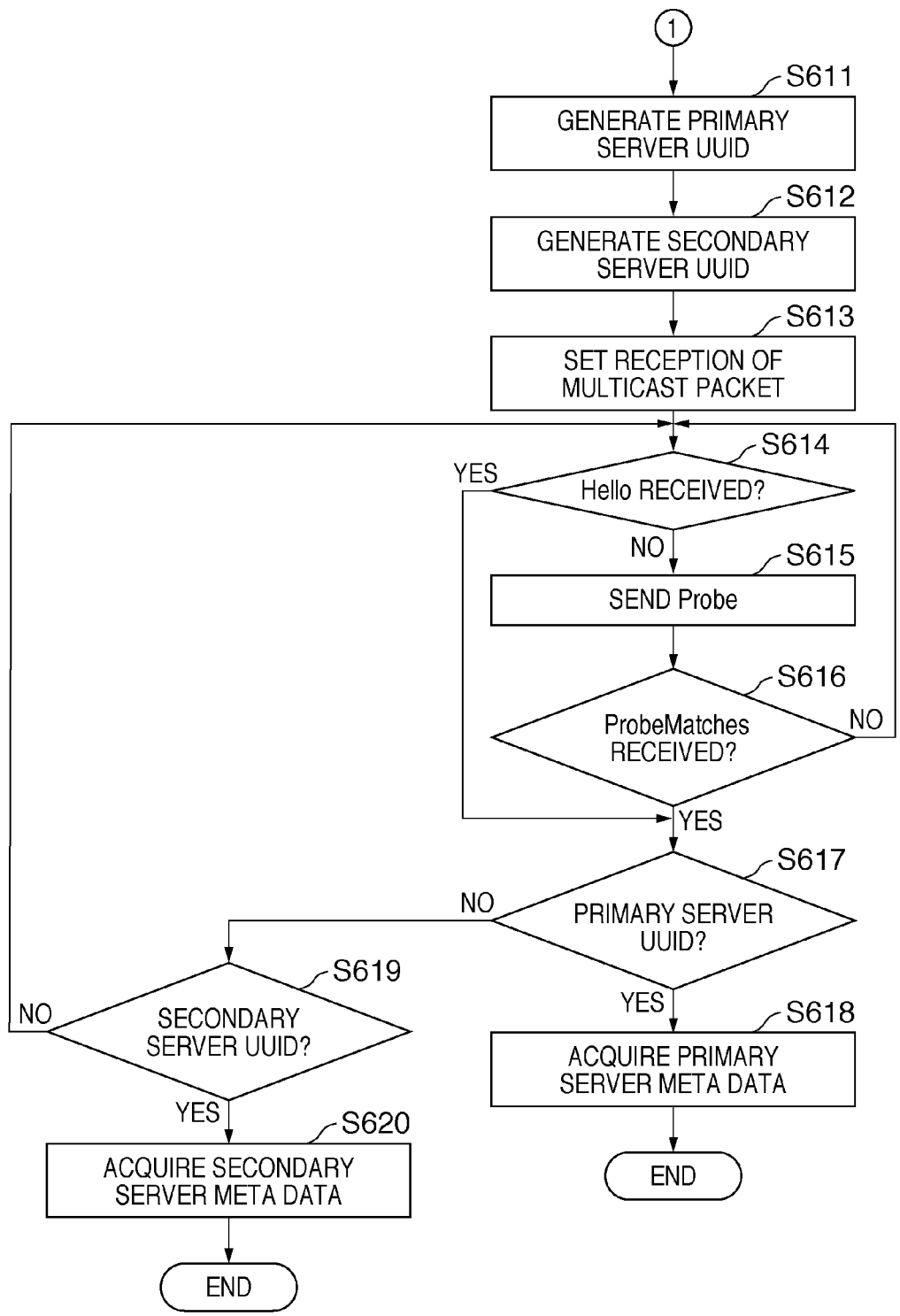

FIGS. 11A and 11B are flowcharts for explaining the operation of the PC 401 which employs the WSD protocol.

In step S601, the PC 401 decides, based on a user instruction, whether or not it is a primary server. If the PC 401 decides that it is a primary server, the process advances to step S602 to send a "Bye" multicast packet to the network. By this processing, a PC which has performed conventional processing is disconnected from the network. In step S603, the PC 401 generates, according to a predetermined procedure, a UUID indicating that the PC 401 is a primary server.

To the contrary, if the PC itself is not a primary server, the process advances to step S608 to decide whether or not the PC itself is a secondary server. If the PC decides that it is a secondary server, the process advances to step S609 to send a "Bye" multicast packet to the network, similar to step S602. In step S610, the PC 401 generates, according to a predetermined procedure, a UUID indicating that the PC 401 is a secondary server.

After generating the UUID in step S603 or S610, the PC 401 generates meta data of the server in advance as a response to a meta data inquiry in step S604. Then, the PC 401 generates a "Hello" multicast packet which is a network connection message containing the UUID generated in step S603 or S610. The PC sends the "Hello" multicast packet generated in step S605 to the network.

By this processing, the PC having the UUID of the primary server or secondary server is connected to the network.

After sending the "Hello" packet to the network, the process advances to step S606 to wait for a meta data acquisition request in preparation for a meta data inquiry from each network-connected apparatus. If the PC 401 receives a meta data acquisition request, the process advances to step S607 to send back the server meta data generated in step S604.

As described above, when the PC according to the embodiment operates as a primary server or secondary server, it uses only a multicast packet to notify that the PC operates as a server. In this embodiment, it is decided based on a user instruction that the PC operates as a primary server or secondary server. Alternatively, the PC itself may autonomously decide, in accordance with another algorithm or the like, that it operates as a primary server or secondary server.

If the PC 401 decides in the processes of steps S601 and S608 that it is neither a primary server nor secondary server (that is, the PC is a client), the process advances to step S611. In steps S611 and S612, the PC 401 generates a UUID indicating a primary server and one indicating a secondary server according to a predetermined method. In step S613, the PC 401 sets to the protocol to receive a "Hello" waiting cast packet which is a network connection message containing the generated UUIDs.

In step S614, the PC 401 examines whether or not it has received the "Hello" packet. If the PC 401 has received the "Hello" packet, the process advances to step S617 to determine whether or not the UUID contained in the packet matches one indicating the primary server. If the UUID contained in the "Hello" packet matches one indicating the primary server, the process advances to step S618 to transmit a meta data acquisition request to the master server. Then, the PC acquires meta data of the master server, analyzes it, and prepares for subsequent processing (not shown) of transmitting and receiving data to and from the server.

If the UUID contained in the "Hello" packet does not match one indicating the primary server, the process advances to step S619 to determine whether or not it matches the UUID indicating the secondary server. If the UUID contained in the "Hello" packet matches one indicating the secondary server, the process advances to step S620 to transmit a meta data acquisition request to the secondary server, thereby acquiring meta data of the secondary server. If the UUID contained in the "Hello" packet does not match one indicating the secondary server, the process returns to step S614 to wait for reception of the "Hello" packet.

In this manner, the PC according to the embodiment accesses the primary server when the primary server exists, and accesses the secondary server when no primary server exists.

If the PC 401 determines in step S614 that it has not received the "Hello" packet, the process advances to step S615 to periodically send a "Probe" packet. In step S616, the PC 401 examines whether or not it has received a "ProbeMatches" packet which is a response to the sent "Probe" packet. If the PC 401 has received the "ProbeMatches" packet, the process advances to step S617 to perform the same processing as that upon receiving the "Hello" packet.

As described above, when the PC according to the embodiment operates as a client, it can detect the presence of servers and discriminate them by using only a response UDP packet with respect to reception of a multicast packet or a multicast packet inquiry.

A method of generating a multicast packet containing the UUID of the primary server or secondary server by the PC will be explained with reference to FIGS. 12A to 12C.

FIGS. 12A to 12C are views exemplifying "Hello" multicast packets issued when the PC executes three different operations.

FIG. 12A exemplifies a normal "Hello" multicast packet issued when the PC operates as a client. A UUID, which is an identifier contained in the packet and indicates the PC, is surrounded by a solid line. In this example, a UUID (character string "000085123456") indicating the MAC address of the network controller of the apparatus is used in the lower 12 digits of the UUID.

FIG. 12B exemplifies a "Hello" multicast packet issued when the PC becomes a primary server. A UUID, which is an identifier contained in the packet and indicates that the PC is a primary server, is surrounded by a solid line. In this example, a character string "000085000001" indicating that the PC is a primary server is used in the lower 12 digits of the UUID. The character string "000085000001" indicating a primary server is recognized commonly by a PC serving as a primary server and that serving as a client.

FIG. 12C exemplifies a "Hello" multicast packet issued when the PC becomes a secondary server. A UUID, which is an identifier contained in the packet and indicates that the PC is a secondary server, is surrounded by a solid line. In this example, a character string "000085000002" indicating that the PC is a secondary server is used in the lower 12 digits of the UUID. The character string "000085000002" indicating a secondary server is recognized commonly by a PC serving as a secondary server and that serving as a client.

In the embodiment, the character strings "000085000001" and "000085000002" are generated as predetermined character strings. However, these character strings may be generated dynamically in accordance with another algorithm as long as the character strings can be shared between a PC serving as either a primary server or secondary server and that serving as a client.

According to the above-described embodiment, when the PC operates as a server, it can notify its operation status without extending a multicast packet defined in standard specifications. Even when the PC operates as a client, it can discriminate the operation statuses of servers by using only a response UDP packet defined in standard specifications with respect to transmission of a multicast packet.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-143666, filed Jun. 16, 2009, which is hereby incorporated by reference herein in its entirety.

What is claimed is:

1. A first printing apparatus capable of communicating with a second printing apparatus and a host computer via a network in accordance with a predetermined protocol, the first printing apparatus comprising:
a decision unit configured to decide, in accordance with an instruction from a user or autonomously, whether the first printing apparatus is a master printer among a plurality of printing apparatuses connected to a network, including the first printing apparatus;
a notifying unit configured to, when the decision unit decides that the first printing apparatus is the master printer, generate an identifier indicating that the first printing apparatus is the master printer, and notify a second printing apparatus and a host computer, using a multicast packet containing the identifier, that the first printing apparatus is the master printer;
a transmission unit configured to transmit, in response to a request from the second printing apparatus or the host computer, meta data to the second printing apparatus or the host computer that has issued the request;
a configuration unit configured to, when the decision unit decides that the first printing apparatus is not the master printer, configure the first printing apparatus to receive a multicast packet from the second printing apparatus operating as the master printer;
a determination unit configured to determine whether the identifier included in the received multicast packet matches an identifier indicating the master printer that is stored by the first printing apparatus;
a request unit configured to, when the determination unit determines that the received identifier matches the identifier indicating the master printer that is stored by the first printing apparatus, request meta data of the second printing apparatus operating as the master printer; and
a reception unit configured to receive the meta data transmitted in response to the request from the request unit.

2. The apparatus according to claim 1, wherein the predetermined protocol includes one of a UPnP protocol and a WSD protocol.

3. The apparatus according to claim 2, wherein the notifying unit sends a "Hello" multicast packet.

4. The apparatus according to claim 2, further comprising a disconnection unit configured to, when the decision unit decides that the first printing apparatus is the master printer, send a "Bye" multicast packet and disconnect the first printing apparatus from the network.

5. The apparatus according to claim 2, further comprising a probe unit configured to send a "Probe" packet when a "Hello" multicast packet is not received from the second printing apparatus operating as the master printer, after configuration by the configuration unit.

6. The apparatus according to claim 2, wherein a UUID is used as the identifier.

7. A printing system comprising a first printing apparatus and a first host computer connected via a network in accordance with a predetermined protocol, wherein
the first printing apparatus includes:
a first decision unit configured to decide, in accordance with an instruction from a user or autonomously, whether the first printing apparatus is a master printer among a plurality of printing apparatuses, connected to a network, including the first printing apparatus;

a first notifying unit configured to, when the first decision unit decides that the first printing apparatus is the master printer, generate an identifier indicating that the first printing apparatus is the master printer, and notify a second printing apparatus and the first host computer, using a multicast packet including the identifier indicating that the first printing apparatus is the master printer;

a first transmission unit configured to transmit, in response to a request from the second printing apparatus or the first host computer, meta data to the second printing apparatus or the first host computer that has issued the request;

a first configuration unit configured to, when the first decision unit decides that the first printing apparatus is not the master printer, configure the first printing apparatus to receive a multicast packet from the second printing apparatuses operating as the master printer;

a first determination unit configured to determine whether the identifier including in the received multicast packet matches an identifier indicating the master printer that is stored by the first printing apparatus;

a first request unit configured to, when the first determination unit determines that the received identifier matches the identifier indicating the master printer that is stored by the first printing apparatus, request meta data of the second printing apparatus operating as the master printer; and a first reception unit configured to receive the meta data transmitted in response to the request from the first request unit, and the first host computer includes:

a second request unit configured to request metadata of the first printing apparatus operating as the master printer in accordance with the multicast packet notified by the first notifying unit; and a display unit configured to receive the meta data transmitted in response to the request from the second request unit, and to display, based on the received meta data, an icon representing a status of the first printing apparatus.

8. The system according to claim 7, wherein the first host computer further includes:

a second decision unit configured to decide, in accordance with an instruction from a user or autonomously, that the first host computer is either a primary server, a secondary server, or a client;

a generation unit configured to generate server meta data when the second decision unit decides that the first host computer is the primary server or the secondary server;

a second notifying unit configured to generate an identifier indicating that the first host computer is a server, and notify the first printing apparatus, the second printing apparatus, and a second host computer that is connected to the network, using a multicast packet containing the identifier indicating that the first host computer is the server; and a second transmission unit configured to transmit, in response to a request from the first printing apparatus, the second printing apparatus, or the second host computer, meta data to the first printing apparatus, the second printing apparatus, or the second host computer that has issued the request.

9. The system according to claim 8, wherein the first host computer further includes:

a second configuration unit configured to, when the second decision unit decides that the first host computer is a client, configure the first host computer to receive a multicast packet from the second host computer or a third host computer operating as a server;

a second determination unit configured to determine whether the identifier included in the received multicast packet matches an identifier indicating the master printer that is stored by the first host computer;

a third request unit configured to, when the second determination unit determines that the received identifier matches the identifier indicating the master printer that is stored by the first host computer, request meta data of the second host computer or the third host computer operating as the server; and a second reception unit configured to receive the meta data transmitted in response to the request from the third request unit.

10. A non-transitory computer-readable storage medium storing a computer-executable program that, when executed by a computer, causes the computer to perform a method comprising:

in accordance with an instruction from a user or autonomously, deciding whether a first printing apparatus among a plurality of printing apparatuses connected to a network is a master printer;

when the first printing apparatus is decided to be the master printer, generating an identifier indicating that the first printing apparatus is the master printer, and notifying a host computer and a second printing apparatus different from the first printing apparatus, using a multicast packet including the identifier that the first printing apparatuses is the master printer;

in response to receiving a request from the host computer or the second printing apparatus, transmitting meta data to the second printing apparatuses or the host computer that has issued the request;

when the first printing apparatus is decided not to be the master printer, configuring the first printing apparatus to receive a multicast packet transmitted by the second printing apparatus operating as the master printer;

in response to receiving the multicast packet transmitted by the second printing apparatus, determining whether an identifier included in the multicast packet transmitted by the second printing apparatus matches an identifier indicating the master printer that is stored by the first printing apparatus; and when the identifier included in the multicast packet transmitted by the second printing apparatus matches the identifier indicating the master printer that is stored by the first printing apparatus, requesting meta data of the second printing apparatus operating as the master printer, and receiving the meta data of the second printing apparatus operating as the master printer.

* * * * *